(12) United States Patent
McCourt

(10) Patent No.: US 10,664,254 B2
(45) Date of Patent: May 26, 2020

(54) ANALYZING BINARY SOFTWARE COMPONENTS UTILIZING MULTIPLE INSTRUCTION SETS

(71) Applicant: Blackberry Limited, Waterloo (CA)

(72) Inventor: William James McCourt, West Lothian (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/166,701

(22) Filed: Oct. 22, 2018

(65) Prior Publication Data

US 2019/0121626 A1    Apr. 25, 2019

Related U.S. Application Data

(60) Provisional application No. 62/575,980, filed on Oct. 23, 2017.

(51) Int. Cl.
| | | |
|---|---|---|
| *G06F 9/44* | (2018.01) | |
| *G06F 8/53* | (2018.01) | |
| *G06F 8/41* | (2018.01) | |
| *G06F 8/75* | (2018.01) | |
| *G06F 11/36* | (2006.01) | |

(52) U.S. Cl.
CPC ............ *G06F 8/53* (2013.01); *G06F 8/433* (2013.01); *G06F 8/75* (2013.01); *G06F 11/3604* (2013.01)

(58) Field of Classification Search
CPC ...................................................... G06F 8/53
USPC ...................................................... 717/136
See application file for complete search history.

(56) References Cited

U.S. PATENT DOCUMENTS

| | | | | |
|---|---|---|---|---|
| 7,383,583 | B2 * | 6/2008 | Marr ...................... | G06F 21/14 717/106 |
| 8,479,161 | B2 | 7/2013 | Weigert | |
| 8,869,109 | B2 * | 10/2014 | Pan .......................... | G06F 8/53 714/39 |
| 2004/0010703 | A1 | 1/2004 | Kouznetsov et al. | |

(Continued)

OTHER PUBLICATIONS when et al., "On Static Binary Translation of ARM/Thumb Mixed ISA Binaries," ACM Transactions on Embedded Computing Systems, ACM, New York, NY, vol. 16, No. 3, Mar. 28, 2017, 25 pages.

(Continued)

*Primary Examiner* — Evral E Bodden
(74) *Attorney, Agent, or Firm* — Fish & Richardson P.C.

(57) ABSTRACT

Systems, methods, and software can be used to analyzing binary software components utilizing multiple instruction sets. In some aspects, one computer-implemented method includes identifying a program section in a binary software component; performing a first disassembly process according to a first instruction set on the program section to produce a first disassembly result; performing a second disassembly process according to a second instruction set different from the first instruction set on the program section to produce a second disassembly result; comparing the first disassembly result to the second disassembly result; and determining a utilized instruction set associated with the program section based at least in part on comparing the first disassembly result to the second disassembly result, wherein the utilized instruction set is either the first instruction set or the second instruction set.

18 Claims, 3 Drawing Sheets

(56) References Cited

U.S. PATENT DOCUMENTS

| | | | |
|---|---|---|---|
| 2004/0034851 A1* | 2/2004 | Ungar | G06F 8/53 717/136 |
| 2012/0072968 A1 | 3/2012 | Wysopal et al. | |
| 2016/0147517 A1 | 5/2016 | Vicovan et al. | |

OTHER PUBLICATIONS

PCT International Search Report and Written Opinion issued in International Application No. PCT/EP2018/079068 dated Feb. 1, 2019, 17 pages.

Zhu et al., "Determining Image Base of Firmware Files for ARM Devices," IEICE Transactions on Information and Systems, vol. E99.D, No. 2, Jan. 1, 2016, 9 pages.

* cited by examiner

ANALYZING BINARY SOFTWARE COMPONENTS UTILIZING MULTIPLE INSTRUCTION SETS

CROSS REFERENCE TO RELATED APPLICATIONS

This application claims the benefit of priority of U.S. Application Ser. No. 62/575,980, filed on Oct. 23, 2017, which is incorporated by reference herein in its entirety.

TECHNICAL FIELD

The present disclosure relates to analyzing binary software components utilizing multiple instruction sets using binary static analysis.

BACKGROUND

Binary static analysis involves examination of a compiled or binary representation of a software program and inferring the various functionalities without actually executing the program. Disassembling a binary software program can include translating the compiled or binary representation of the program into assembly language. In some cases, binary software components can include multiple instruction sets. For example, a component may utilize a 16-bit instruction set and a 32-bit instruction set.

DESCRIPTION OF DRAWINGS

Like reference numbers and designations in the various drawings indicate like elements.

DETAILED DESCRIPTION

Figure 1:
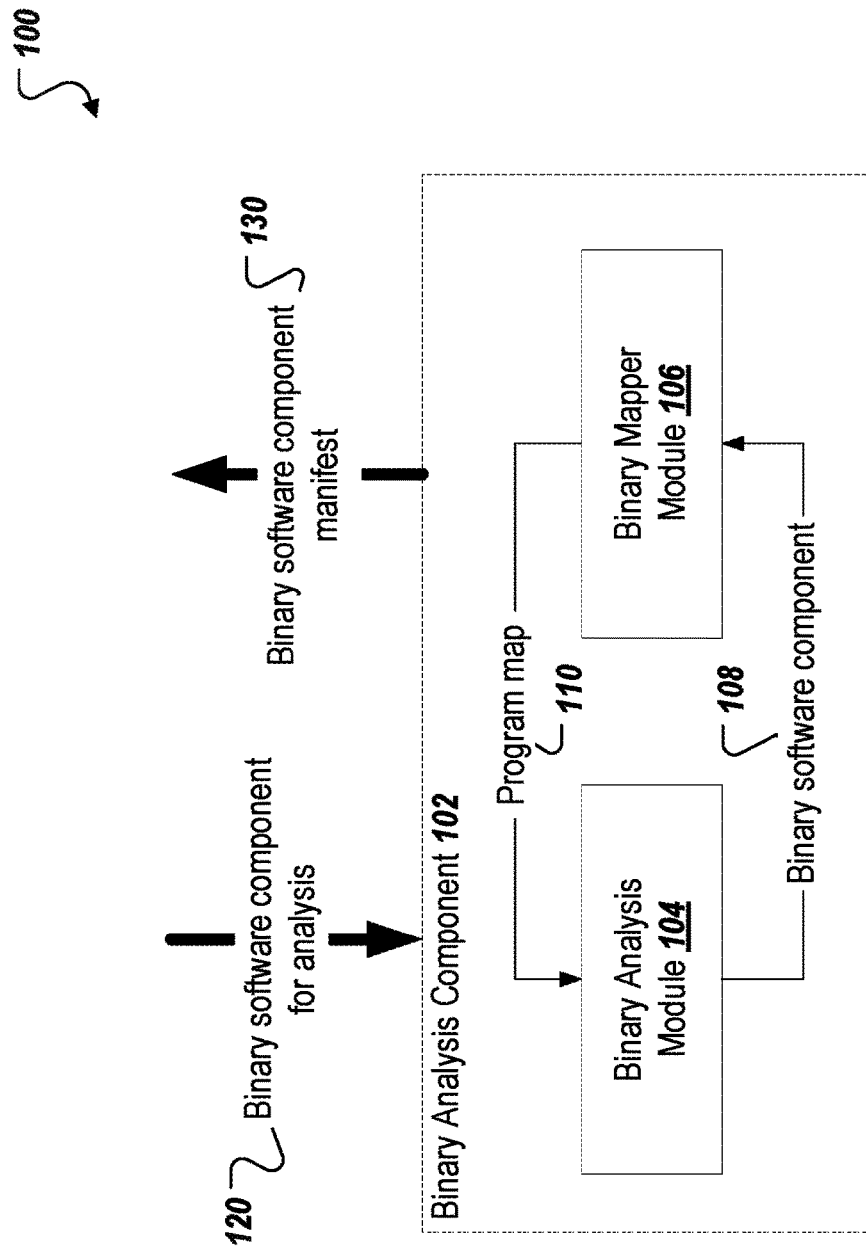
FIG. 1 is a schematic diagram showing a system that analyzes binary software components utilizing multiple instruction sets using binary static analysis, according to an implementation.

Binary static analysis allows binary software components to be analyzed without referring to the high-level source code from which the binary software component was compiled. Binary static analysis is performed by examining the content and structure of the binary data making up the binary software component. Using these techniques, characteristics of the binary software component can be identified, including, but not limited to, functions defined in the program, application programming interfaces (APIs) used by the program, compiler defensive techniques implemented in the functions defined in the program, and other characteristics of the binary software component. Due to the general unavailability of corresponding high-level source code to users of binary software components, analyzing the complexity of a binary software component using binary static analysis would allow users to more easily evaluate the likelihood of bugs and logic errors occurring during execution of the binary software component.

Binary software components are binary files including instructions to be executed by a processor. A binary software component may be generated from a set of source code by a compiler program, which translates the source code into instructions specific to a particular processor (e.g., INTEL CORE I7) or processor architecture (e.g., ARM). The binary software component may include a number of code blocks that equate roughly to functions defined in source code.

Generally, file formats used to encode binary software components (e.g., Executable and Linkable Format (ELF)) indicate areas of the file where executable code resides, but they do not indicate the locations of individual functions and data. In some cases, it may be possible to identify functions by using a symbol table encoded in the file. This table, however, may not contain references to all functions and in some cases may not be included in the file. A map identifying the start and end locations of functions of functions, as well as data components for the function, may be used to perform a binary static analysis on the binary software component.

In addition, binary software components compiled for some processor architectures (e.g., ARM) may contain a mixture of instruction sets. For example, a binary software component compiled for the ARM architecture may include instructions from the ARM 32-bit instruction set, as well as instructions from the THUMB 16-bit instruction set. In some cases, a binary software component may not include any indication regarding which code blocks using which instruction set.

The present disclosure describes techniques for identifying different instruction sets within a binary software component using binary static analysis. In some cases, FIGS. 1-3 and associated descriptions provide additional details of these implementations. These approaches provide a mechanism to allow different instruction sets within a binary software component to be identified using binary static analysis. The techniques described herein may allow binary software components using multiple instruction sets to be disassembled and analyzed using binary static analysis. Further, the techniques described herein may allow the functions and associated data included in a binary software component to be mapped, which may allow further analysis of the binary software component.

FIG. 1 is a schematic diagram showing a system 100 that identifies different instruction sets within a binary software component using binary static analysis, according to an implementation. The system 100 includes a binary analysis component 102, which can include a binary analysis module 104 and a binary mapper module 106. The binary analysis component 102 can include a system for performing binary static analysis on software components to generate a manifest (130) including characteristics of the binary software component determined by its analysis. The binary analysis component 102 can include one or more computing devices executing software programs, such as the binary analysis module 104 and the binary mapper module 106, to perform portions of the analysis of software components.

In an example operation, the binary analysis component 102 can receive a binary software component for analysis (120). The source of the binary software component can be, for example, a software build environment, a software deployment manager, or an executable file (not shown). The binary analysis module 104 of the binary analysis component 102 can perform binary static analysis on the binary software component. In some cases, the binary analysis module 104 performs this analysis utilizing a program map 110 generated by the binary mapper module 106. The binary analysis module may provide the binary software component (or a reference to it) to the binary mapper module 106 (108). The binary mapper module 106 may perform a first disassembly of the binary software component according to a first instruction set, followed by a second disassembly of the binary software component according to a second instruction set.

Based on the results of the first and second disassemblies, the binary mapper module 106 can determine which instruction set is utilized by different program sections of the binary software component. For example, if a binary software component utilizes a 16-bit instruction set and a 32-bit instruction set, the binary mapper module 106 may perform a disassembly of the component according to the 16-bit instruction set, and a disassembly of the component according to the 32-bit instruction set. The binary mapper module 106 may determine that a particular program section utilizes the 16-bit instruction set because the 16-bit disassembly of the section was successful, while the 32-bit disassembly was unsuccessful. For example, a 32-bit disassembly of a 16-bit program section may be unsuccessful because the disassembly may interpret the first 32 bits of an instruction as an instruction identifier, when in fact only the first 16 bits of the instruction represent the instruction identifier in a 16-bit instruction set. Errors such as this may cause the disassembly to produce incorrect results, such as incorrectly identifying instructions or unknown instructions. The presence of incorrect results indicates that the disassembly was unsuccessful.

In some implementations, the program map 110 may include information about program sections (e.g., functions, data structures) included in the binary software component, including, but not limited to, an instruction set utilized by the program section, a starting location of the program section within the binary software component, an ending location of the program section within the binary software component, or other information. The binary analysis module 104 may use the program map 110 to perform the binary static analysis of the binary software component. For example, the binary analysis module 104 may iterate through each program section in the map, and begin its analysis at the specified starting location within the binary software component. The binary analysis module 104 may also use the instruction set specified for the function in the program map 110 to disassemble the instructions for each program section during its analysis of the binary software component.

Figure 2:
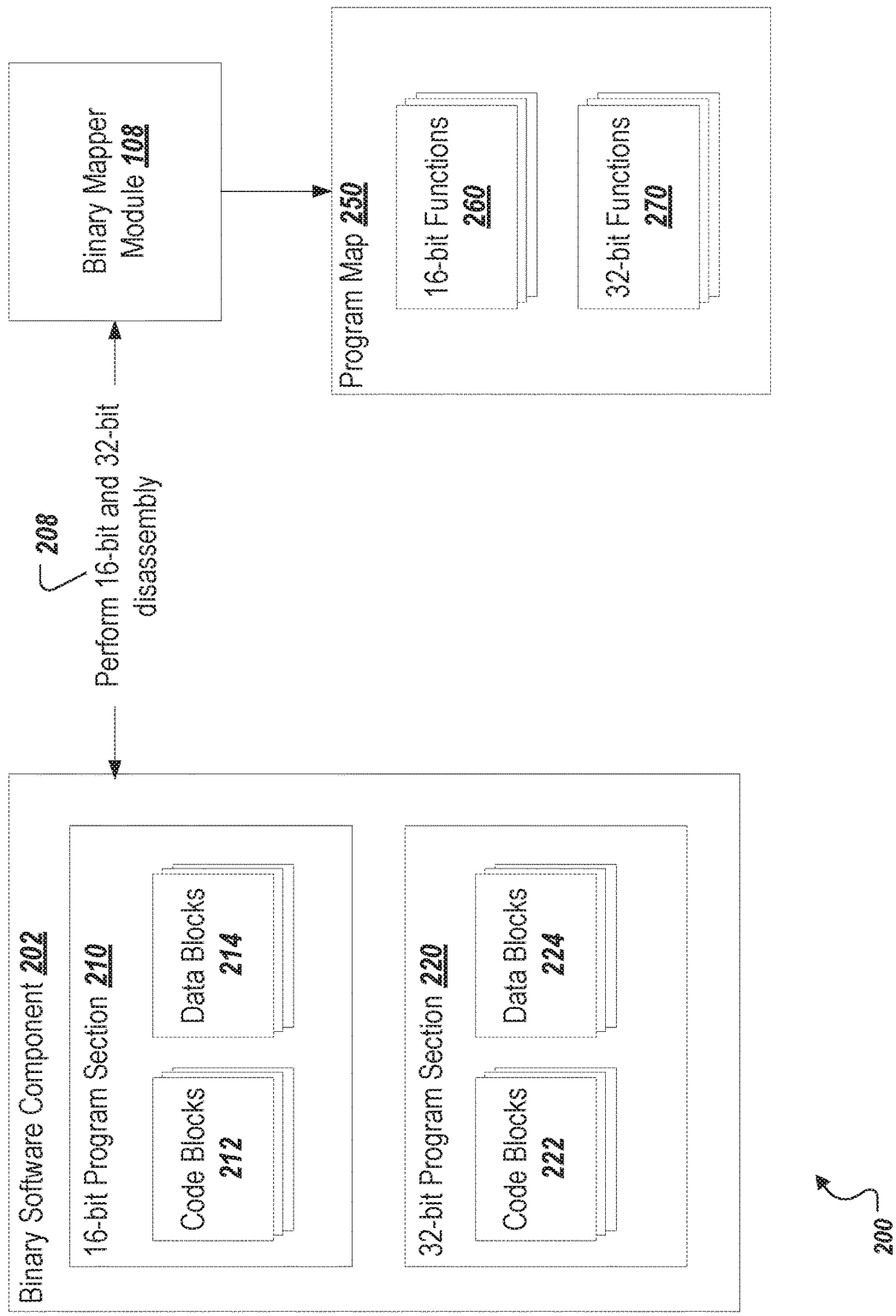
FIG. 2 is a schematic diagram showing an example system that generates a map of a software component that utilizes multiple instruction sets, according to an implementation.

FIG. 2 is a schematic diagram showing an example system 200 that generates a program map of a software component, according to an implementation. In some cases, a binary software component can include multiple instruction sets. As one example, the binary software component 202 utilizes a 16-bit instruction set and a 32-bit instruction set, and includes a 16-bit program section 210 and a 32-bit program section 220. The 16-bit program section 210 can include code blocks 212 and data blocks 214. Similarly, the 32-bit program section 220 can include code blocks 222 and data blocks 224. In some cases, the code blocks (212, 222) can be representations of functions, and the data blocks (214, 224) can be representations of data structures.

As shown, the binary mapper module 108 can perform a 16-bit disassembly and a 32-bit disassembly on the binary software component 202 (208). The disassembly results can be sent to the binary mapper module 108. The binary mapper module 108 can compare and analyze the disassembly results and generate or update a program map 250. The program map 250 can identify the 16-bit functions 260 and 32-bit functions 270 of the binary software component 202. The functions (260, 270) can include starting boundaries and ending boundaries, which can be located and identified by the binary mapper module 108 based at least in part on the comparison and analysis of the disassembly results.

Figure 3:
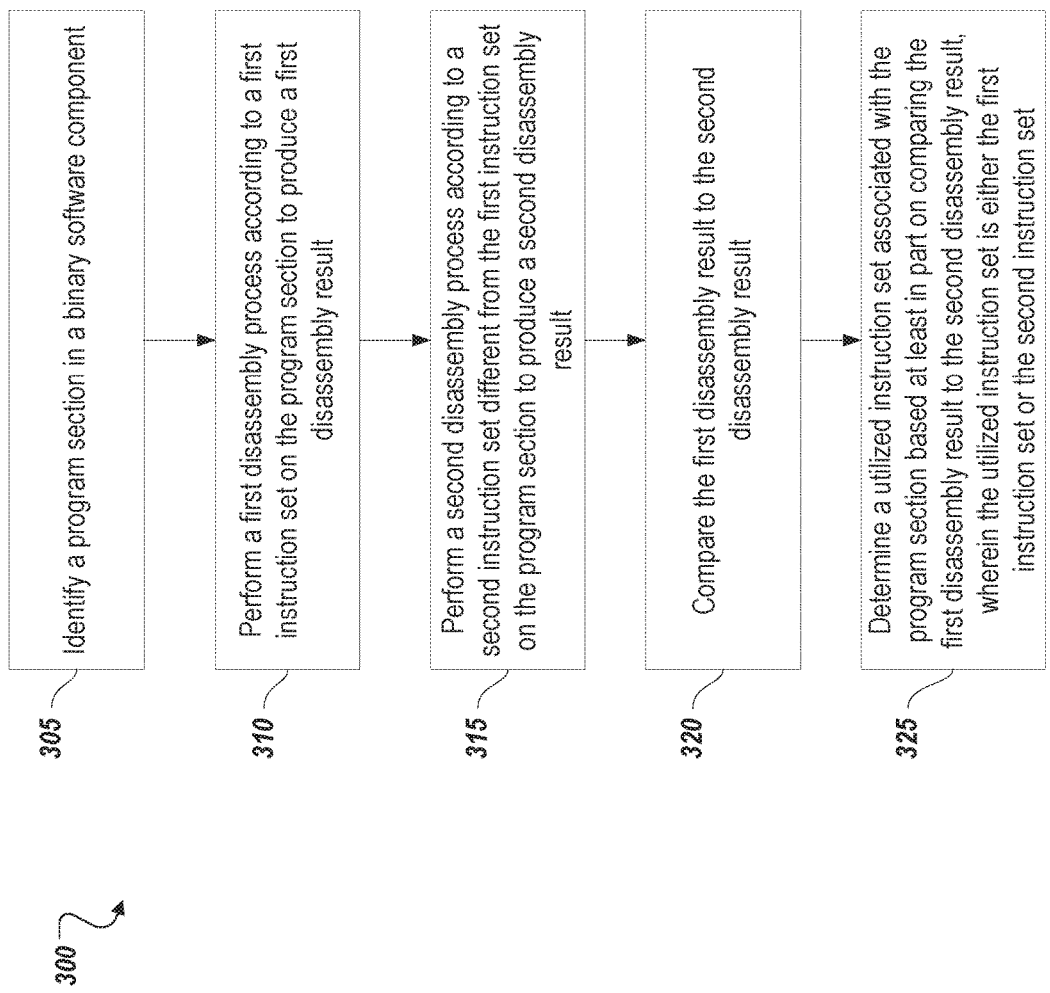
FIG. 3 is a flow diagram showing a method for analyzing binary software components utilizing multiple instruction sets using binary static analysis, according to an implementation.

FIG. 3 is a flow diagram showing a method 300 for disassembling a binary software component, according to an implementation. At 305, a program section is identified in a binary software component. The binary software component can be encoded in a binary file format, such as Executable and Linkable Format (ELF), Common Object File Format (COFF), System Object Model (SOM) format, Mach Object File Format (Mach-O), or Portable Executable (PE) format. In certain implementations, the program section includes at least one code block including one or more instructions defined in a set of source code from which the binary software component was compiled. In certain implementations, the program section includes at least one data structure defined in a set of source code from which the binary software component was compiled.

At 310, a first disassembly process is performed according to a first instruction set on the program section. A first disassembly result is produced from the first disassembly process. In certain implementations, the first instruction set is a 16-bit instruction set, a 32-bit instruction set, or a 64-bit instruction set. The first disassembly result can include various anomalies that occurred during the first disassembly process, such as successful and unsuccessful references, calls and branches in the program section, data loads, and disassembly outputs.

At 315, a second disassembly process is performed according to a second instruction set different from the first instruction set on the program section. A second disassembly result is produced from the second disassembly process. In certain implementations, the second instruction set is a 16-bit instruction set, a 32-bit instruction set, or a 64-bit instruction set, different from the first instruction set at 310. The second disassembly result can include various anomalies that occurred during the second disassembly process, such as successful and unsuccessful references, calls and branches in the program section, data loads, and disassembly outputs. As one example, the binary software component can be encoded in ELF, with a first instruction set that is ARM (which is a 32-bit instruction set) and a second instruction set that is THUMB (which is a 16-bit instruction set).

At 320, the first disassembly result from 310 is compared to the second disassembly result from 315. In some cases, the successful and unsuccessful references of the disassembly results can be compared.

At 325, a utilized instruction set associated with the program section is determined based at least in part on comparing the first disassembly result to the second disassembly result at 320. The utilized instruction set is either the first instruction set or the second instruction set. In some cases, the comparison of successful and unsuccessful references between the two instruction sets can help determine the utilized instruction set associated with the program section. In certain implementations, method 300 includes identifying at least one function included in the program section and identifying a starting boundary and an ending boundary of the function, based at least in part on the utilized instruction set associated with the program section. In certain implementations, method 300 includes updating a map of the binary software component to include the identified function. The map of the binary software component can include starting boundaries and ending boundaries for functions included in the binary software component. In relation to system 100, the map of the binary software component can be included, for example, in the binary software component manifest 130.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service users using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
   identifying a program section in a binary software component;
   performing a first disassembly process according to a first instruction set on the program section to produce a first disassembly result, wherein the first instruction set is one of a 16-bit instruction set, a 32-bit instruction set, or a 64-bit instruction set;
   performing a second disassembly process according to a second instruction set different from the first instruction set on the program section to produce a second disassembly result, wherein the second instruction set is a different one of the 16-bit instruction set, the 32-bit instruction set, or the 64-bit instruction set than the first instruction set;
   comparing the first disassembly result to the second disassembly result; and
   determining a utilized instruction set associated with the program section based at least in part on comparing the first disassembly result to the second disassembly result, wherein the utilized instruction set is either the first instruction set or the second instruction set.

2. The method of claim 1, further comprising:
   identifying at least one function included in the program section; and
   identifying a starting boundary and an ending boundary of the function based at least in part on the utilized instruction set associated with the program section.

3. The method of claim 2, further comprising:
   updating a map of the binary software component to include the identified function, wherein the map of the binary software component includes starting boundaries and ending boundaries for functions included in the binary software component.

4. The method of claim 2, wherein the identified function corresponds to a function defined in a set of source code from which the binary software component was compiled.

5. The method of claim 1, wherein the program section includes at least one code block including one or more instructions defined in a set of source code from which the binary software component was compiled.

6. The method of claim 1, wherein the program section includes at least one data structure defined in a set of source code from which the binary software component was compiled.

7. The method of claim 1, wherein the binary software component is encoded in a binary file format.

8. The method of claim 7, wherein the binary file format is one of Executable and Linkable Format (ELF), Common Object File Format (COFF), System Object Model (SOM) format, Mach Object File Format (Mach-O), or Portable Executable (PE) format.

9. The method of claim 1, wherein the first instruction set is an Advanced RISC Machine (ARM) instruction set and the second instruction set is THUMB instruction set.

10. An electronic device comprising:
    at least one hardware processor;
    a non-transitory computer-readable medium coupled to the at least one hardware processor and storing programming instructions for execution by the at least one hardware processor, wherein the at least one hardware processor is configured to execute the programming to perform operations comprising:
       identifying a program section in a binary software component;
       performing a first disassembly process according to a first instruction set on the program section to produce a first disassembly result, wherein the first instruction set is one of a 16-bit instruction set, a 32-bit instruction set, or a 64-bit instruction set;
       performing a second disassembly process according to a second instruction set different from the first instruction set on the program section to produce a second disassembly result, wherein the second instruction set is a different one of the 16-bit instruction set, the 32-bit instruction set, or the 64-bit instruction set than the first instruction set;
       comparing the first disassembly result to the second disassembly result; and
       determining a utilized instruction set associated with the program section based at least in part on comparing the first disassembly result to the second disassembly result, wherein the utilized instruction set is either the first instruction set or the second instruction set.

11. The electronic device of claim 10, the operations further comprising:
    identifying at least one function included in the program section; and
    identifying a starting boundary and an ending boundary of the function based at least in part on the utilized instruction set associated with the program section.

12. The electronic device of claim 11, the operations further comprising:
    updating a map of the binary software component to include the identified function, wherein the map of the binary software component includes starting boundaries and ending boundaries for functions included in the binary software component.

13. The electronic device of claim 11, wherein the identified function corresponds to a function defined in a set of source code from which the binary software component was compiled.

14. The electronic device of claim 10, wherein the program section includes at least one code block including one or more instructions defined in a set of source code from which the binary software component was compiled.

15. The electronic device of claim 10, wherein the program section includes at least one data structure defined in a set of source code from which the binary software component was compiled.

16. The electronic device of claim 10, wherein the binary software component is encoded in a binary file format.

17. The electronic device of claim 16, wherein the binary file format is one of Executable and Linkable Format (ELF), Common Object File Format (COFF), System Object Model (SOM) format, Mach Object File Format (Mach-O), or Portable Executable (PE) format.

18. One or more non-transitory computer-readable media containing instructions which, when executed, cause an electronic device to perform operations comprising:
- identifying a program section in a binary software component;
- performing a first disassembly process according to a first instruction set on the program section to produce a first disassembly result, wherein the first instruction set is one of a 16-bit instruction set, a 32-bit instruction set, or a 64-bit instruction set;
- performing a second disassembly process according to a second instruction set different from the first instruction set on the program section to produce a second disassembly result, wherein the second instruction set is a different one of the 16-bit instruction set, the 32-bit instruction set, or the 64-bit instruction set than the first instruction set;
- comparing the first disassembly result to the second disassembly result; and
- determining a utilized instruction set associated with the program section based at least in part on comparing the first disassembly result to the second disassembly result, wherein the utilized instruction set is either the first instruction set or the second instruction set.

* * * * *